(12) United States Patent
Gusler et al.

(10) Patent No.: US 6,976,067 B2
(45) Date of Patent: Dec. 13, 2005

(54) METHOD AND APPARATUS FOR PROVIDING ENTITLEMENT INFORMATION FOR INTERACTIVE SUPPORT

(75) Inventors: Carl Phillip Gusler, Austin, TX (US); Rick Allen Hamilton, II, Charlottesville, VA (US)

(73) Assignee: International Business Machines Corporation, Armonk, NY (US)

(*) Notice: Subject to any disclaimer, the term of this patent is extended or adjusted under 35 U.S.C. 154(b) by 809 days.

(21) Appl. No.: 09/947,881

(22) Filed: Sep. 6, 2001

(65) Prior Publication Data

US 2003/0046410 A1 Mar. 6, 2003

(51) Int. Cl.⁷ .......................................... G06F 15/173
(52) U.S. Cl. .................. 709/223; 709/205; 709/224; 709/253; 715/705; 715/714
(58) Field of Search ........................... 709/202–205, 709/217–219, 223–226, 253; 715/705, 708, 711–715, 741, 753

(56) References Cited

U.S. PATENT DOCUMENTS

| | | | |
|---|---|---|---|
| 5,563,805 A | 10/1996 | Arbuckle et al. | 709/204 |
| 5,678,002 A | 10/1997 | Fawcett et al. | 709/224 |
| 5,727,174 A * | 3/1998 | Aparicio et al. | 715/705 |
| 5,765,033 A | 6/1998 | Miloslavsky | 709/206 |
| 5,799,151 A * | 8/1998 | Hoffer | 709/204 |
| 5,862,322 A | 1/1999 | Anglin et al. | 714/57 |
| 5,923,307 A * | 7/1999 | Hogle, IV | 345/4 |
| 5,940,614 A | 8/1999 | Allen et al. | 715/705 |
| 5,964,839 A * | 10/1999 | Johnson et al. | 709/224 |
| 5,978,595 A | 11/1999 | Tanaka et al. | 715/705 |
| 6,125,390 A * | 9/2000 | Touboul | 709/223 |
| 6,128,646 A | 10/2000 | Miloslavsky | 709/206 |
| 6,170,002 B1 | 1/2001 | Ouchi | 709/206 |
| 6,233,570 B1 | 5/2001 | Horvitz et al. | 706/11 |
| 6,363,411 B1 * | 3/2002 | Dugan et al. | 709/202 |
| 6,604,141 B1 | 8/2003 | Ventura | 709/227 |
| 6,615,240 B1 * | 9/2003 | Sullivan et al. | 709/205 |
| 6,658,465 B1 * | 12/2003 | Touboul | 709/223 |
| 6,687,749 B1 | 2/2004 | Chavez et al. | 709/223 |
| 6,691,159 B1 * | 2/2004 | Grewal et al. | 709/219 |
| 6,750,879 B2 * | 6/2004 | Sandberg | 715/714 |
| 6,779,030 B1 * | 8/2004 | Dugan et al. | 709/223 |
| 2002/0067372 A1 | 6/2002 | Friedrich et al. | 715/753 |
| 2002/0122050 A1 | 9/2002 | Sandberg | 715/705 |

OTHER PUBLICATIONS

IBM Technical Disclosure Bulletin, Mar. 1985, vol. 27, No. 10B, p. 6128, "Method for Selecting Contextual Help in Interactive Systems".

IBM Technical Disclosure Bulletin, Aug. 1990, vol. 33, No. 3A, pp. 290–291, "Problem Determination Support Expert System".

IBM Research Disclosure, Oct. 1998, vol. 41, No. 414, "Customer Support by Calling Agent Automatically on Browser During Self Problem Determination".

\* cited by examiner

Primary Examiner—Bharat Barot
(74) Attorney, Agent, or Firm—Duke W. Yee; David A. Mims, Jr.

(57) ABSTRACT

A method, apparatus, and computer instructions for providing real-time user support. Monitoring is performed for a user input selecting a particular option on a desktop in the data processing system. In response to detecting the user input, a request is generated for real-time user support, wherein the request includes entitlement information used to determine a type of support to be provided. The request is sent to initiate a communication link for real-time user support.

22 Claims, 5 Drawing Sheets

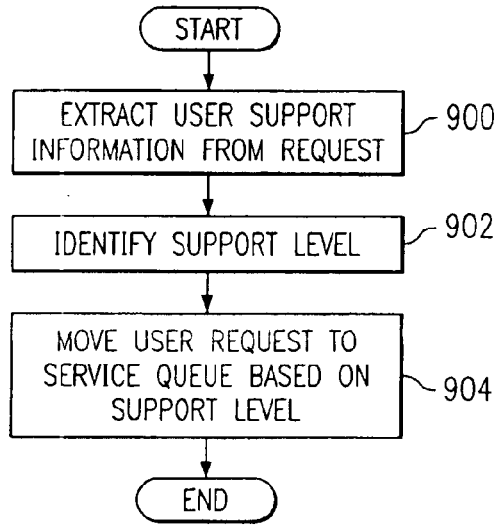
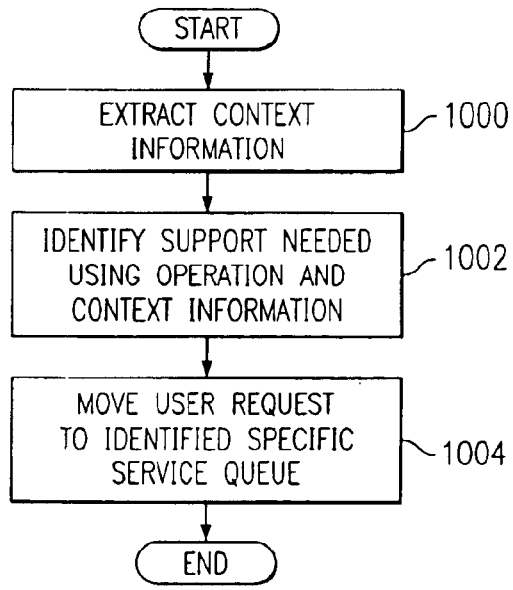
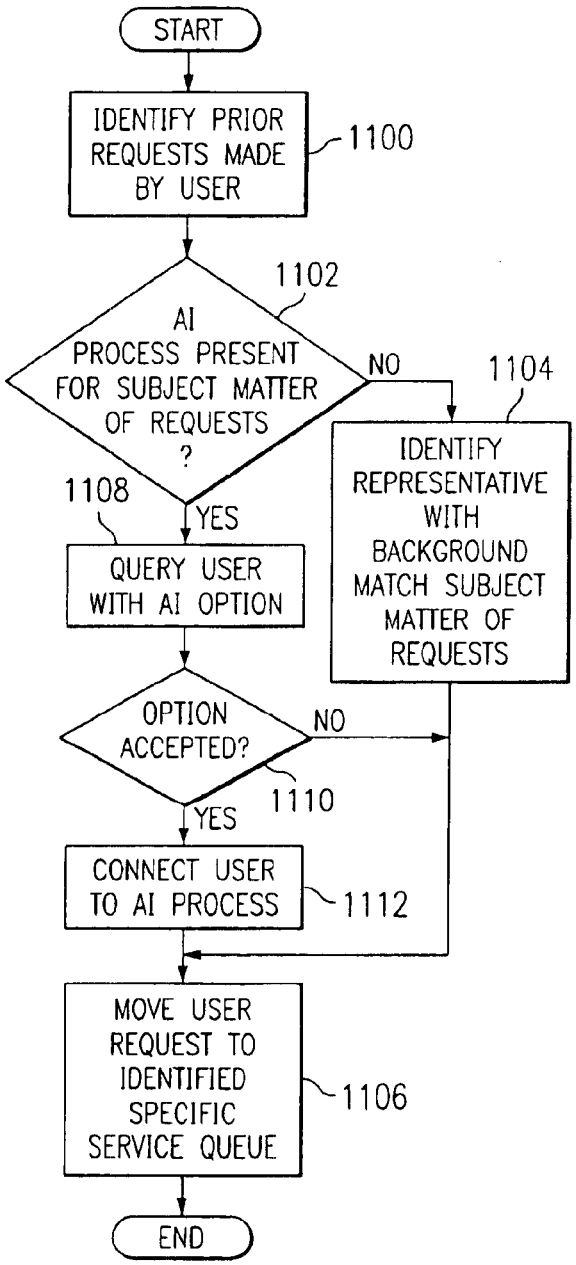

METHOD AND APPARATUS FOR PROVIDING ENTITLEMENT INFORMATION FOR INTERACTIVE SUPPORT

CROSS REFERENCE TO RELATED APPLICATIONS

The present invention is related to the following applications entitled: "Method and Apparatus for Providing User Support Based on Contextual Information", Ser. No. 09/947,863, "Method and Apparatus for Providing User Support through an Intelligent Help Agent", Ser. No. 09/947,880, and "Initiation of Interactive Support from a Computer Desktop", Ser. No. 09/947,864, all of which are filed even date hereof, assigned to the same assignee, and incorporated herein by reference.

BACKGROUND OF THE INVENTION

1. Technical Field

The present invention relates generally to an improved data processing system and in particular to an improved method and apparatus for processing data. Still more particularly, the present invention provides an improved method, apparatus, and computer instructions for initiating user support in a data processing system.

2. Description of Related Art

Although significant advances in graphical user interfaces have made software applications more accessible and productive for personal computer users, the increased ease of use has fostered a demand to include more and more sophisticated features. Difficulties are present in using, administering, installing, and configuring software applications. When first exposed to a complicated software application, a new user may be confused by the overwhelming number and complexity of features accessible through the menus and toolbars of the user interface. It is not uncommon for a user unfamiliar with the software features to resort to menu surfing, rapidly switching from menu item to menu item, in the hope of discovering how to effect the desired feature.

With new product releases, it is normal for additional features to be added, rather than subtracted. Given this fact, end users and administrators face an unending task of learning new functionalities in applications. The size of application manuals both physical and electronic have increased with each new version. Additionally, help databases are commonly delivered with the software application in an effort to provide new search and demonstration capabilities to help users in mastering the applications.

Currently, for computer-related support, four options exist. First, an option of calling the software vendor to ask a question may be used. Unfortunately, long hold times and long-distance charges usually make this an unattractive option. Next, an option of consulting a paper (i.e., "hard copy") manual is available. Further, a user may consult a search database delivered with the product. Alternatively, a user may search the vendor's Web site to obtain information and answers to questions. Though the second, third, and fourth options are frequently used, these options do not always answer the question. The most expedient way to answer questions is still to speak with a product expert; that being said, such an initiative is constrained by the disadvantages mentioned above.

Therefore, it would be advantageous to have an improved method, apparatus, and computer instructions for providing user support.

SUMMARY OF THE INVENTION

The present invention provides a method, apparatus, and computer instructions for providing real-time user support. Monitoring is performed for a user input selecting a particular option on a desktop in the data processing system. In response to detecting the user input, a request is generated for real-time user support, wherein the request includes entitlement information used to determine a type of support to be provided. The request is sent to initiate a communication link for real-time user support.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart of a process used for routing a request for support in accordance with a preferred embodiment of the present invention;

FIG. 10 is a flowchart of a process used for processing context information in accordance with a preferred embodiment of the present invention;

FIG. 11 is a flowchart of a process used for routing a request to different types of representatives in accordance with a preferred embodiment of the present invention;

DETAILED DESCRIPTION OF THE PREFERRED EMBODIMENT

Figure 1:
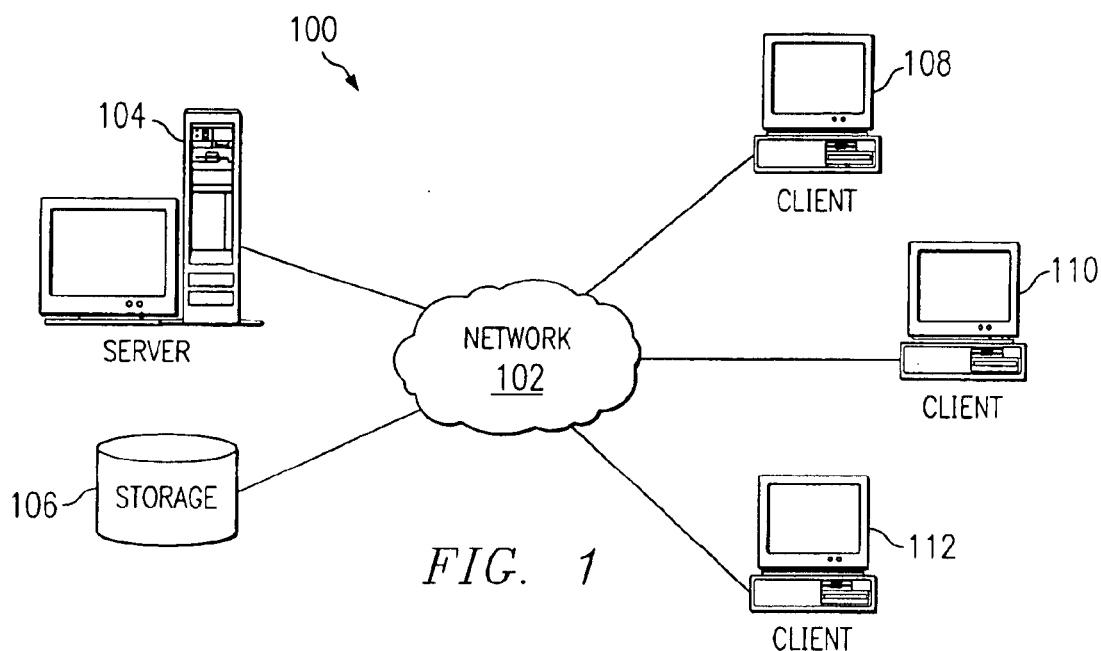
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
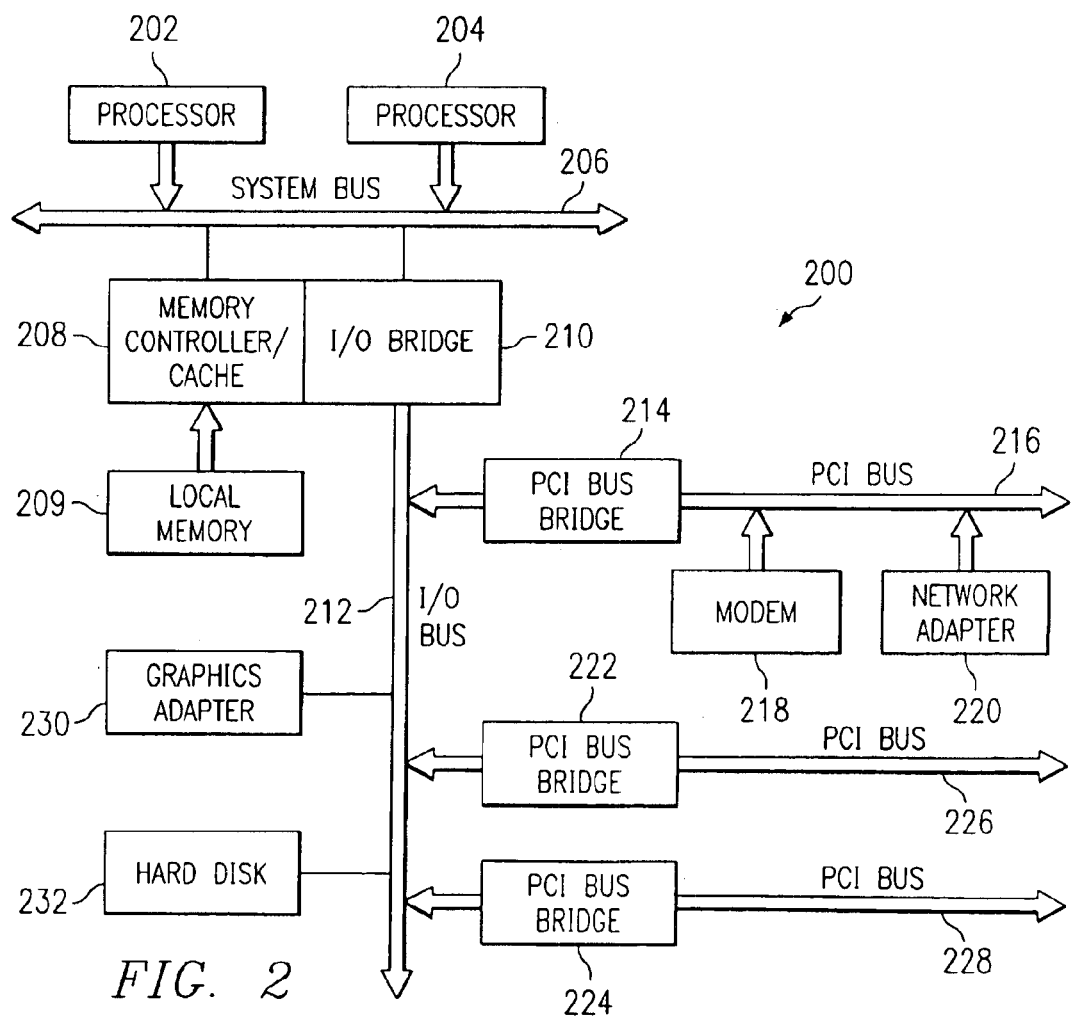
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
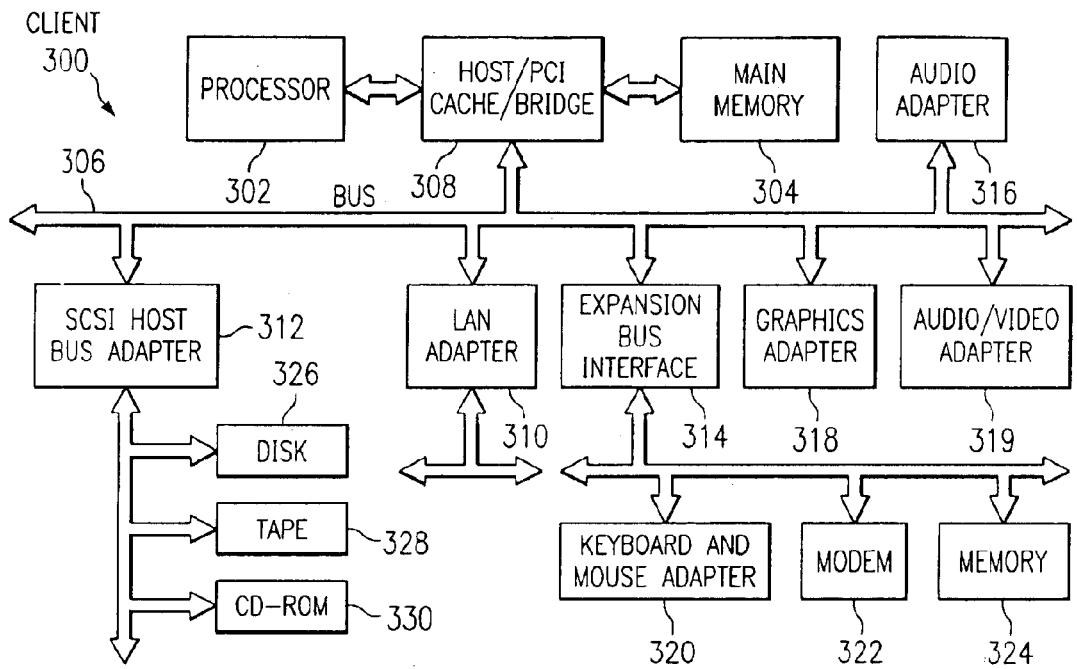
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for providing real-time interaction with a support service. This mechanism allows a user to initiate or establish a communications link with a customer service representative.

Figure 4:
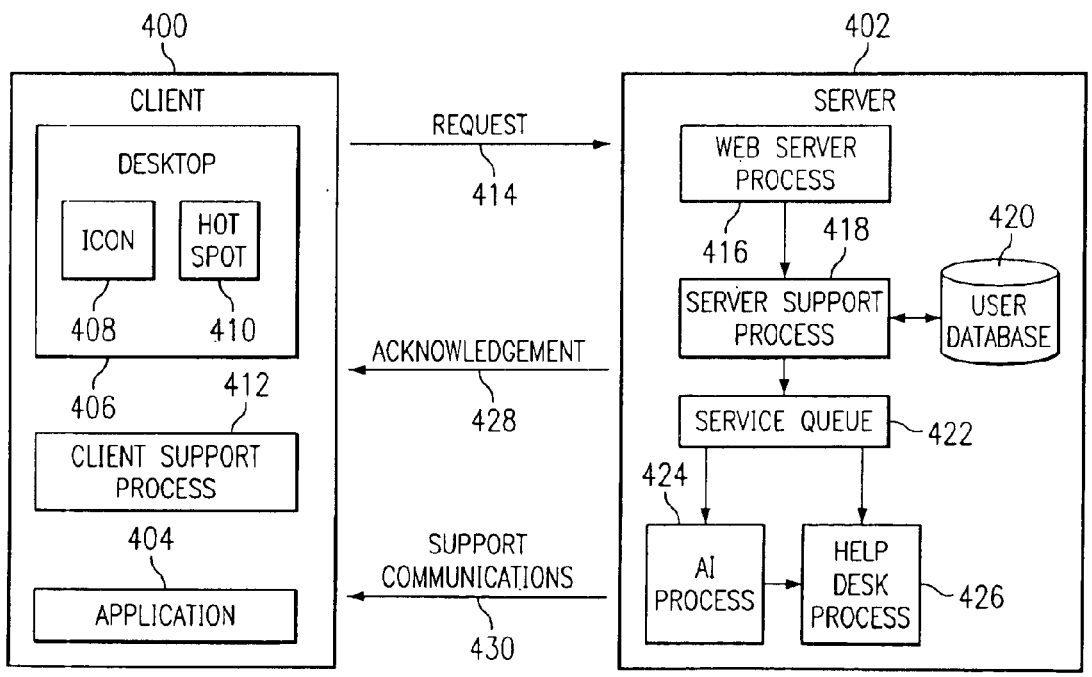
FIG. 4 is a diagram illustrating data flow in providing interactive support to a user in accordance with a preferred embodiment of the present invention.

With reference now to FIG. 4, a diagram illustrating data flow in providing interactive support to a user is depicted in accordance with a preferred embodiment of the present invention. In this example, a user at client 400 may obtain user support from server 402. Client 400 may be implemented using data processing system 300 in FIG. 3. Server 402 may be implemented using data processing system 200 in FIG. 2. The user may desire user support for application 404. The user may select a region on desktop 406 in client 400, such as icon 408. This icon may be a traditional icon that is left-clicked using a mouse or a traditional icon with a pull-down option that is activated using right-click action. Alternatively, this region may be hot spot 410 on desktop 406. Additionally, this region may be a region on a screen in a wireless personal digital assistant (PDA). Selection of one of these regions initiates client support process 412, which generates request 414 and sends this request to server 402. Icon 408 and hot spot 410 may be associated with a particular application, such as application 404 or may be associated with a suite of applications supported by the support service. Selection of one of these regions, in this instance, initiates a request for support for a particular application or set of applications.

Request 414 is received by Web server process 416 and forwarded to server support process 418 for handling. Server support process 418 will analyze request 414 to provide the appropriate user support. In identifying user support that is to be provided, server support process 418 will query user database 420. Request 414 may include information used for identifying a level of support or a service level to be provided to the user. Request 414 may then be placed into service queue 422 for handling. Requests within service queue 422 may be handled using different priority schemes, such as a first-in-first-out basis. Alternatively, requests within service queue 422 may be associated with priority indicators, such that those requests with higher priorities are handled first.

Further, request 414 may include context information, which is used to direct request 414 to an appropriate support service, such as artificial intelligence (AI) process 424 or help desk process 426. In some cases, request 414 may be handled using AI process 424. AI process 424 is a process that exhibits human intelligence and may be used to provide user support for certain types of requests. AI process 424 reviews the context information, reviews common context-related problems, reviews known behavior of the application, and provides queries and suggestions to the application user in an effort to answer the support question. With proper programming, AI process 424 may be able to communicate effectively with the user without the user knowing that he or she is not working directly with a human expert. For example, the user's request for support may result from an inability to print information from the application. AI process 424 may be able to review the context information and tell the user, "You have selected a network printer but are operating in standalone mode. Please try again using a directly attached printer."

AI process 424 may query the user to help diagnose the problem. For example, AI process 424 may ask the user, "Are you able to print a simple file to this printer outside of the application?" Answers provided by the user to AI process 424 would be used in the AI problem analysis process. AI process 424 may suggest courses of action for the user and request information about results. The requested actions performed by the user would be expected to generate additional context information to help AI process 424 diagnose the problem. For example, AI process 424 may instruct the user, "Set the print page margins to half an inch and try again. Are you able to successfully print now?"

Finally, if AI process 424 exhausts all diagnostic possibilities without success, AI process 424 may instruct the user on a method to generate detailed context information in preparation for queueing or transferring the problem to a human help desk staffer. For example, AI process 424 may instruct the user, "Select the full diagnostic dump option, and try your print function again. The next action you will see will be a conversations window open with our support staff." AI process 424 would not only provide more detailed context information about the user's system, but would also assist the human staffer in completing resolution of the problem. When the human staffer takes ownership of the support transaction, his or her computer desktop would already be populated with information from AI process 424. Once the human call-taker's PC desktop lights up with this particular caller's problem, various windows might open with ratings on likely solutions to the problem, information about the diagnostic paths already taken, tech support database searches for similar problems, on-line internal proprietary technical references opened to appropriate sections, etc. The context information may be used by help desk process 426 to connect a user to an appropriate human service representative. Context information is always critical to diagnosing and resolving a support problem. Context information would include information about the user's computer, such as which operating system it is running, what software updates are applied, what printers are configured, and how the computer is configured on the customer's network. Context information would include information about the application or software suite itself, such as which software modules are installed and which application updates are applied. The most important context information would relate to recent application actions and tasks that were recently performed, usually represented in an application transaction log. For example, some representatives may be skilled in providing help on functions in an application, while other representatives may be skilled in providing help with errors that occur in an applications.

Additionally, the context information may identify applications that are executing or applications in which the user requires help, such as application 404. With an identification of an application, request 414 may be sent to the appropriate representative. By analyzing context information, help desk process 426 may connect the user at client 400 to the appropriate representative.

The communication with the user at client 400 occurs through a communications link, such as one via a TCP/IP connection. In these examples, the interaction between the user at client 400 and a representative providing the user support may occur using an instant messaging or chat program. Instant messaging involves a computer conference using the keyboard over the Internet between two or more people. Instant messaging is not a dial-up system like the telephone. Instead, this system requires that both parties be online at the same time. The names of people to which the message is to be sent are entered. Also, when any of those individuals log on, the user is "instantly" notified so that the user can begin an interactive chat session.

In the business world, instant messaging is often used to avoid telephone tag, or to find out if a person is available to take a phone call. Many instant messaging sessions wind up as traditional telephone calls. However, instant messaging is expected to be the catalyst for IP-based phone calls initiated directly from the computer to provide a seamless move from typing to talking. A chat program provides a real-time conferencing capability between two or more users on a local network (LAN) or on the Internet. The chat is accomplished by typing on the keyboard, not speaking. Each keystroke is transmitted as it is pressed. Further, the real-time user support may be provided through a voice over Internet protocol (IP) connection, which allows the user to talk directly with the representative through the communications link.

Figure 5:
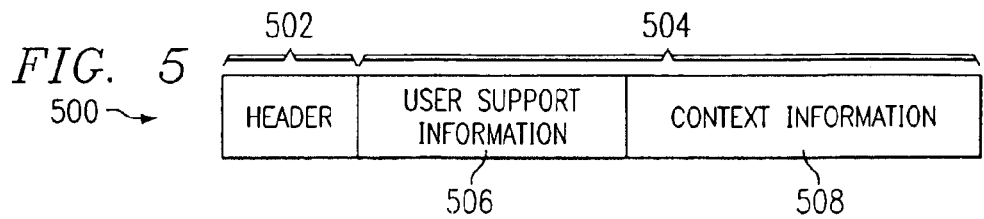
FIG. 5 is a diagram of a request in accordance with a preferred embodiment of the present invention.

Turning next to FIG. 5, a diagram of a request is depicted in accordance with a preferred embodiment of the present invention. Request 500 is an example of a request, such as request 404 in FIG. 4. In this example, request 500 includes header 502 and payload 504. Header 502 contains the information used to route request 500 to the appropriate server. In this example, payload 504 contains user support information 506 and context information 508. User support information 506 contains information that will be used to determine what level of support a user may receive. For example, the information may include customer numbers, application inventory information, license keys, or other information validating the customer's identity and applications in use. This information may be used to provide a priority for request 500.

Context information 508 may contain information about recent user operation for use in routing request 500 to the appropriate service representative. For example, if a user is attempting a servlet configuration function and initiates a request for help, the last few attempted operations may be included in context information 508 in request 500. In this instance, request 500 may be sent to a service representative with an expertise in servlets, rather than a more general representative. Context information includes information Habout the user's computer, such as which operating system it is running, what software updates are applied, what printers are configured, and how the computer is configured on the customer's network. Context information would include information about the application or software suite itself, such as which software modules are installed and which application updates are applied. The most important context information would relate to recent application actions and tasks that were recently performed, usually represented in an application transaction log. This information is particularly useful for product support teams that are divided into different areas of expertise for the application.

Figure 6:
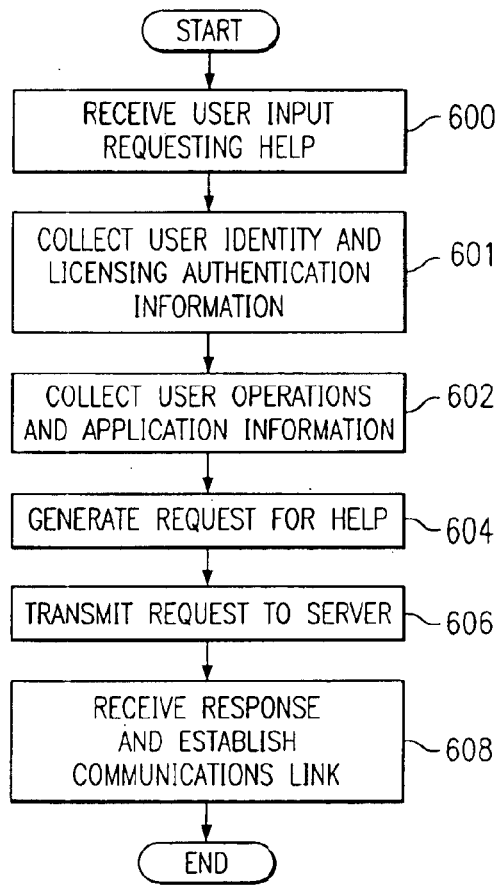
FIG. 6 is a flowchart of a process used for requesting real-time support is depicted in accordance with a preferred embodiment of the present invention.

With reference now to FIG. 6, a flowchart of a process used for requesting real-time support is depicted in accordance with a preferred embodiment of the present invention. The process illustrated in FIG. 6 may be implemented in a support process on a client, specifically the client support process 412 in FIG. 4. This process may be implemented as instructions in a computer program.

The process begins by receiving a user input requesting help (step 600). At the time of the request for help, the user might be prompted for a help priority or problem severity level. Next, information is collected that is needed by the application provider to determine the entitlement of the user to receive support (step 601). This information could include a user identification, a password, a user's organization, licensing and authentication information, a support level, an expiration date, and type of support.

Information is collected that is needed by the support provider to determine the source of the problem (step 602). This information would include an inventory of the applications being executed and user operations prior to the request for help. The information identified in steps 601 and 602 forms context information that may be placed into the request. Next, a request for help is generated (step 604). A request may take the form of request 500 in FIG. 5, depending on the particular implementation. Then, the request is transmitted to a server (step 606). A response is received and a communications link is established (step 608) with the process terminating thereafter. The communications link may be, for example, for a chat session, instant messaging, or voice-over IP.

Figure 7:
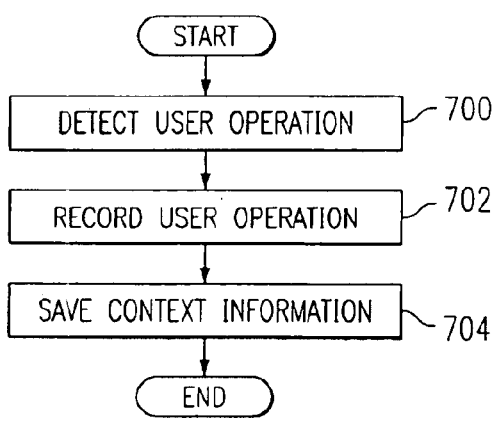
FIG. 7 is a flowchart of a process used for recording context information in accordance with a preferred embodiment of the present invention.

Turning next to FIG. 7, a flowchart of a process used for recording context information is depicted in accordance with a preferred embodiment of the present invention. The process illustrated in FIG. 7 may be implemented in a support process on a server, such as server support process 418 in FIG. 4. This process may be implemented as instructions in a computer program.

The process begins by detecting a user operation (step 700). The user operation is recorded (step 702). context information is saved (step 704) and the process terminates. This information may be used at a later time when a request for support is made.

Figure 8:
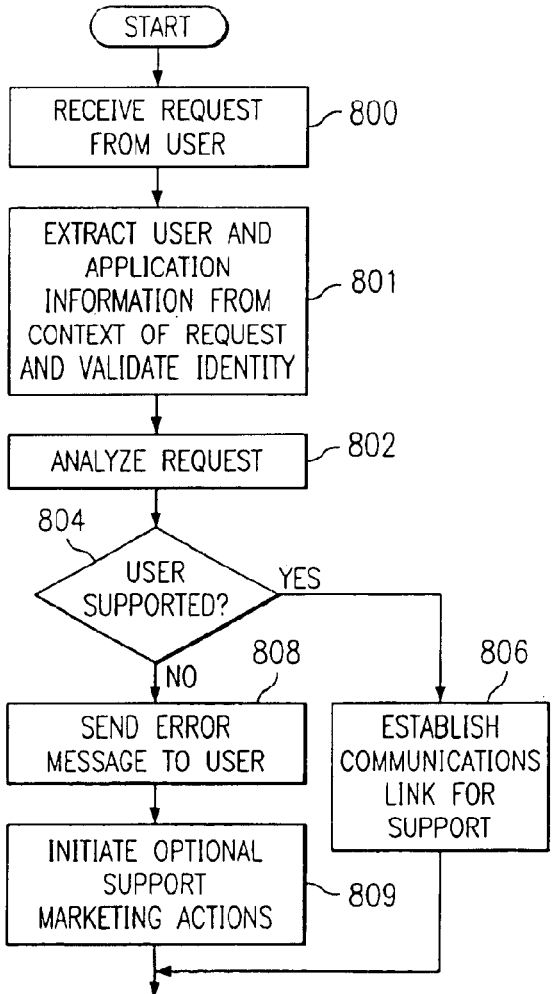
FIG. 8 is a flowchart of a process used for processing a request for support in accordance with a preferred embodiment of the present invention.

With reference now to FIG. 8, a flowchart of a process used for processing a request for support is depicted in accordance with a preferred embodiment of the present invention. The process illustrated in FIG. 8 may be implemented in a support process on a server, such as server support process 418 in FIG. 4. This process may be implemented as instructions in a computer program.

The process begins by receiving a request from a user (step 800). This request may be forwarded to the process from a Web server in the server machine, such as Web server 416 in FIG. 4. Next, the context information received with the request is examined to identify the user, user's organization (the customer organization), the applications in use, and other identity validation information (step 801). Next, the validated identity is compared with entitlement information in the user database and customer database (step 802). A determination is made as to whether the user is supported, whether the user's organization is current on support contracts, and whether the user is supported for the specific application (step 804). This determination may be made by querying a database of users, such as user database 420 in FIG. 4. If the user is supported, a communications link is established for support (step 806) and the process terminates. This communications link may be established by an AI process or a human user interacting with a help desk process, such as AI process 424 or help desk process 426 in FIG. 4. Turning back to step 804, if the user is not supported, an error message is sent to the user (step 808) indicating that support is not available, with the process terminating thereafter. Prior to termination, the receiving process has the option of performing a support marketing function (step 809). The application provider may choose to display advertising information in order to interest the user in subscribing to the support service. The marketing function might include the facility to provide a limited trial use of the on-line support service, such as providing responses to a limited number of questions, or on-line support for a limited number of minutes or over a limited number of days.

Turning next to FIG. 9, a flowchart of a process used for routing a request for support is depicted in accordance with a preferred embodiment of the present invention. The process illustrated in FIG. 9 may be implemented in a support process on a server, such as server support process 418 in FIG. 4. This process may be implemented as instructions in a computer program.

The process begins by extracting user support information from a request (step 900). This information may include, for example, a user identification, a password, a support level, an expiration date, and type of support. This information may be used to query a database to verify the user and identify a support level for the user. Next, a support level is identified for the user from the user support information (step 902). Depending on the support level, a user may be given more or less priority in terms of wait time. Additionally, preferred users may be connected to representatives with more expertise or provided with support on a 24 hour a day/7 day a week basis, while other users may be given more limited times. The user is queued to a support representative based on the support level identified (step 904) with the process terminating thereafter. The connection may be made by placing the request into a server queue, such as service queue 422 in FIG. 4.

With reference now to FIG. 10, a flowchart of a process used for processing context information is depicted in accordance with a preferred embodiment of the present invention. The process illustrated in FIG. 10 may be implemented in a support process on a server, such as server support process 418 in FIG. 4. This process may be implemented as instructions in a computer program. The process begins by extracting context information from the user's support request (step 1000). This context information, may include, for example, an identification of an application as well as an identification of recent actions or operations performed by the user with respect to the identified application. Next, support needed is identified by using the context information extracted (step 1002). Depending on the application or operations in the context information, the request may be directed towards a representative with an appropriate expertise to help the user. For example, if the application is a spreadsheet application and the operations performed are associated with graphics and display, the request may be identified or tagged for processing by a representative, who has an expertise in graphics or presentations with the particular spreadsheet application. Then, the user is queued to the identified support (step 1004) with the process terminating thereafter.

Additionally, by monitoring recent actions prior to the call through use of an application transaction log or some first-in-first-out command stream buffer (e.g., "the last ten actions were related to servlet configuration, and the user recently looked at servlet help in the machine-bound database"), the user may have the option of accessing an "intelligent" help agent based upon their recent actions, while they wait in the chat queue for a representative. In some cases, an intelligent agent, such as AI process 424 in FIG. 4, may be invoked to answer questions rather than a human representative.

Turning next to FIG. 11, a flowchart of a process used for routing a request to different types of representatives is depicted in accordance with a preferred embodiment of the present invention. The process illustrated in FIG. 11 may be implemented in a support process on a server, such as server support process 418 in FIG. 4. This process may be implemented as instructions in a computer program.

The process begins by identifying prior requests made by a user (step 1100). First, an estimate is calculated of the user's wait time anticipated until a qualified human technician will be available and prepared to answer questions (step 1101). Next, a determination is made as to whether the AI process is present for the subject matter of the requests (step 1102). If the AI process is not present, a representative with a background to match the subject matter of the requests is identified (step 1104). Next, the user is connected to a representative (step 1106) with the process terminating thereafter. This connection may be made by placing the request in a service queue, such as service queue 422 in FIG. 4.

Turning back to step 1102, if the AI process is present for the subject matter of the requests, a user with an AI option is queried (step 1108). This step provides for an ability to present a user with the opportunity to have questions answered by an intelligent agent, such as an AI process, prior to being connected to a human or live representative. A determination is made as to whether the option is accepted (step 1110). If the option is not accepted, the process proceeds to step 1106 as described above. Otherwise, the user is connected to the AI process (step 1112) with the process proceeding to step 1106 as described above.

Figure 12:
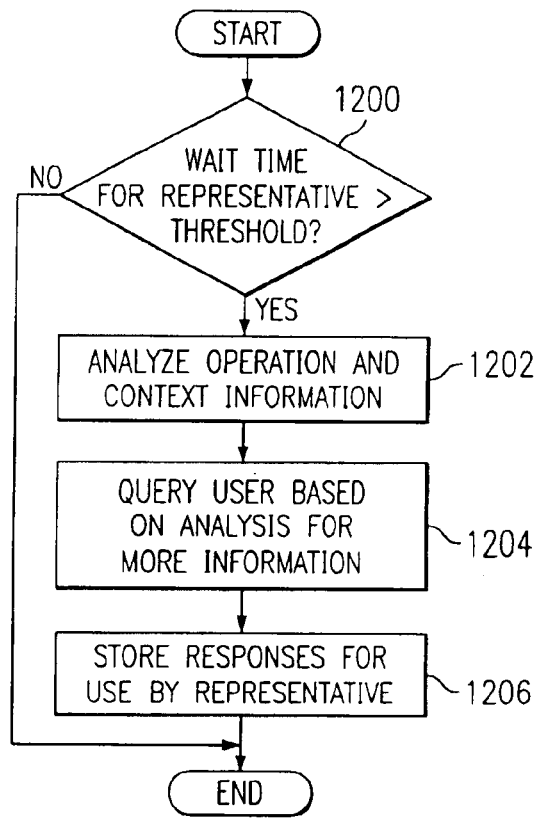
FIG. 12 is a flowchart of a process used for gathering information used to provide support to a user in accordance with a preferred embodiment of the present invention.

With reference now to FIG. 12, a flowchart of a process used for gathering information used to provide support to a user is depicted in accordance with a preferred embodiment of the present invention. The process illustrated in FIG. 12 may be implemented in a support process on a server, such as server support process 418 in FIG. 4. This process may be implemented as instructions in a computer program.

The process begins with a determination as to whether the wait time for a representative is greater than a threshold (step 1200). If the wait time is not greater than the threshold, the process terminates, and the request remains in the service queue awaiting attention. Otherwise, the operation and context information is analyzed by the artificial intelligence (AI) agent (step 1202). A user is queried based on an analysis for more information (step 1204). If the AI agent can determine useful questions to query the user about their problem and their objectives, the AI agent provides queries to the user. The responses are stored for use by a representative(step 1206) with the process terminating thereafter. The request remains in the service queue awaiting human attention.

Figure 13:
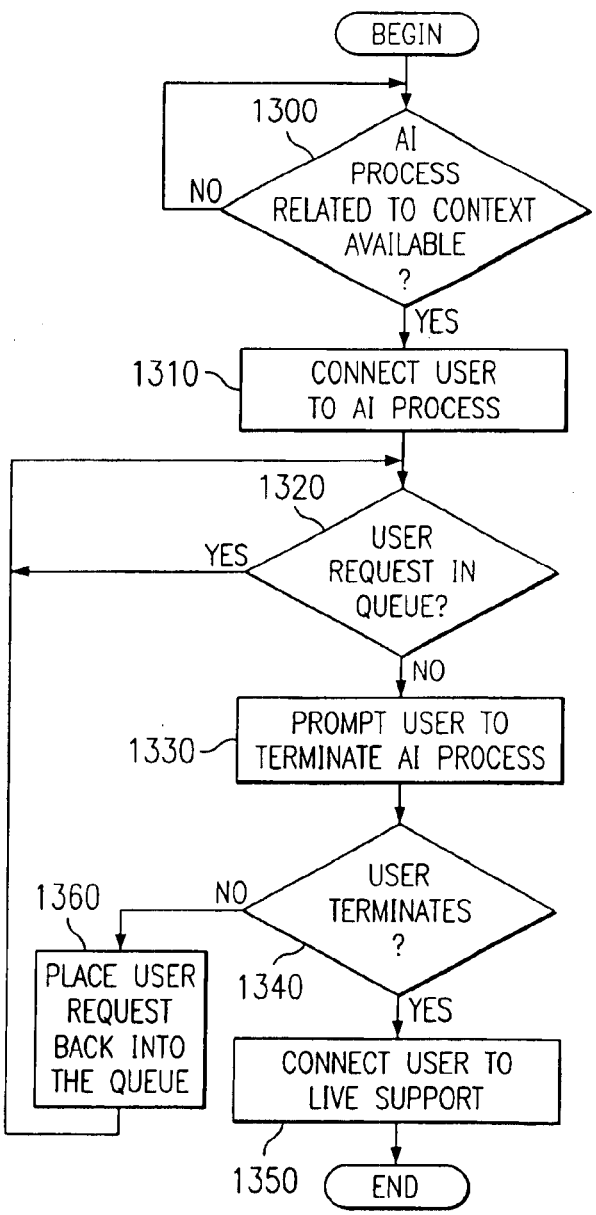
FIG. 13 is a flowchart of a process for providing artificial intelligence support while waiting for live support in accordance with a preferred embodiment of the present invention.

Turning next to FIG. 13, a flowchart of a process for providing artificial intelligence support while waiting for live support is depicted in accordance with a preferred embodiment of the present invention. The process illustrated in FIG. 13 may be implemented using server support process 418 in FIG. 4 to identify when an AI process, such as AI process 424 in FIG. 4 may be used. This process may be used for handling requests located in a service queue, such as service queue 422 in FIG. 4, awaiting live help.

The process begins with a determination as to whether an AI process is related to the context available (step 1300). For example, if the context identified for the request relates to network configurations, a determination may be made to identify whether an AI process for network configurations is available. If an AI process related to the context is available, the user is connected to the AI process (step 1310). After this occurs, a determination is made as to whether the user request is located in the queue (step 1320). If the user request is removed from the queue, this situation indicates that the request has been removed for connection to a help desk process, such as help desk process 426 in FIG. 4.

If the user request is not located in the queue, the user is prompted to terminate the AI process (step 1330). Next, a determination is made as to whether the user has terminated the AI process (step 1340). If the user has terminated the AI process, the user is connected to live support (step 1350) with the process terminating thereafter.

Referring back to step 1320, if the user request is located in the queue, the process continues to return to step 1320. Turning back to step 1340, if the user has not terminated the process, the user request is placed back into the queue (step 1360), after which the process returns to step 1320 as described above.

Thus, the present invention provides an improved method, apparatus, and computer instructions for providing an improved support service system to users. The mechanism of the present invention allows for initiation of a communications link with a support service in response to a selection of an icon or other region on a desktop. In these examples, the support takes the form of an interactive session between a user and a representative, such as an AI process or a human representative.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing real-time user support, the method comprising:
   monitoring for a user input selecting a particular option on a desktop in the data processing system;
   responsive to detecting the user input, generating a request for real-time user support, wherein the request includes entitlement information used to determine a type of support to be provided; and
   sending the request to initiate a communications link for real-time user support.

2. The method of claim 1, wherein the particular option is an icon on the desktop or a contextual keystroke.

3. The method of claim 1, further comprising:
   presenting an icon in a graphical user interface in the data processing system, wherein the icon is associated with the particular option.

4. The method of claim 1, wherein the entitlement information in the request includes support information used to identify a level of support for a user.

5. The method of claim 1, wherein entitlement information includes at least one of a user identification, a password, a user's organization, licensing and authentication information, a support level, an expiration date, and type of support.

6. The method of claim 1, wherein the request also includes at least one of operations performed by a user and context information.

7. The method of claim 1, wherein the entitlement information is compared to support information by a real-time user support service to validate entitlement to real-time user support.

8. A data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to monitor for a user input selecting a particular option on a desktop in the data processing system, generate a request for real-time user support in response to detecting the user input in which the request includes entitlement information used to determine a type of support to be provided, and send the request to initiate a communications link for real-time user support.

9. A data processing system for providing real-time user support, the data processing system comprising:
   monitoring means for monitoring for a user input selecting a particular option on a desktop in the data processing system;
   generating means, responsive to detecting the user input, for generating a request for real-time user support, wherein the request includes entitlement information used to determine a type of support to be provided; and
   sending means for sending the request to initiate a communications link for real-time user support.

10. The data processing system of claim 9, wherein the particular option is an icon on the desktop or a contextual keystroke.

11. The data processing system of claim 9, further comprising:
   presenting means for presenting an icon in a graphical user interface in the data processing system, wherein the icon is associated with the particular option.

12. The data processing system of claim 9, wherein the entitlement information in the request includes support information used to identify a level of support for a user.

13. The data processing system of claim 9, wherein entitlement information includes at least one of a user identification, a password, a user's organization, licensing and authentication information, a support level, an expiration date, and type of support.

14. The data processing system of claim 9, wherein the request also includes at least one of operations performed by a user and context information.

15. The data processing system of claim 9, wherein the entitlement information is compared to support information by a real-time user support service to validate entitlement to real-time user support.

16. A computer program product in a computer readable medium for providing real-time user support, the computer program product comprising:
   first instructions for monitoring for a user input selecting a particular option on a desktop in the data processing system;
   second instructions, responsive to detecting the user input, for generating a request for real-time user support, wherein the request includes entitlement information used to determine a type of support to be provided; and third instructions for sending the request to initiate a communications link for real-time user support.

17. The computer program product of claim 16, wherein the particular option is an icon on the desktop or a contextual keystroke.

18. The computer program product of claim 16, further comprising:

fourth instructions for presenting an icon in a graphical user interface in the data processing system, wherein the icon is associated with the particular option.

19. The computer program product of claim 16, wherein the entitlement information in the request includes support information used to identify a level of support for a user.

20. The computer program product of claim 16, wherein entitlement information includes at least one of a user identification, a password, a user's organization, licensing and authentication information, a support level, an expiration date, and type of support.

21. The computer program product of claim 16, wherein the request also includes at least one of operations performed by a user and context information.

22. The computer program product of claim 16, wherein the entitlement information is compared to support information by a real-time user support service to validate entitlement to real-time user support.

* * * * *